United States Patent
Kjar et al.

(10) Patent No.: US 9,567,918 B2
(45) Date of Patent: Feb. 14, 2017

(54) BI-FUEL CONTROL SYSTEMS FOR AUTOMOTIVE VEHICLES AND RELATED METHODS

(75) Inventors: Lucas Kjar, Woods Cross, UT (US); Matthew M. Matsukawa, Kaysville, UT (US)

(73) Assignee: Go Natural CNG, LLC, Woods Cross, UT (US)

( * ) Notice: Subject to any disclaimer, the term of this patent is extended or adjusted under 35 U.S.C. 154(b) by 418 days.

(21) Appl. No.: 13/104,970

(22) Filed: May 10, 2011

(65) Prior Publication Data
US 2011/0276253 A1 Nov. 10, 2011

Related U.S. Application Data

(60) Provisional application No. 61/333,184, filed on May 10, 2010.

(51) Int. Cl.
| | |
|---|---|
| *F02B 13/00* | (2006.01) |
| *F02D 19/06* | (2006.01) |
| *F02D 41/00* | (2006.01) |

(52) U.S. Cl.
CPC ......... *F02D 19/0623* (2013.01); *F02D 19/066* (2013.01); *F02D 19/0615* (2013.01); *F02D 19/0692* (2013.01); *F02D 41/0025* (2013.01); *F02D 19/0628* (2013.01); *F02D 19/0647* (2013.01); *F02D 41/0027* (2013.01); *Y02T 10/36* (2013.01)

(58) Field of Classification Search
CPC ...... F02D 19/00; F02D 19/0613; F02D 19/08; F02M 43/00
USPC .................. 123/575–578, 525, 526, 27 GE; 701/112–115
See application file for complete search history.

(56) References Cited

U.S. PATENT DOCUMENTS

| | | | |
|---|---|---|---|
| 5,117,802 A | 6/1992 | Durbin | |
| 5,203,305 A * | 4/1993 | Porter | ..................... F02B 69/00 |
| | | | 123/478 |
| 5,713,336 A | 2/1998 | King | |
| 5,755,211 A | 5/1998 | Koch | |
| 5,832,905 A | 11/1998 | King | |
| 5,881,701 A | 3/1999 | King | |

(Continued)

FOREIGN PATENT DOCUMENTS

| | | |
|---|---|---|
| EP | 1281850 A2 | 2/2003 |
| EP | 2000652 A1 | 12/2008 |

(Continued)

OTHER PUBLICATIONS

CS/CTS User Guide, Edge Products, Ver. 3, 2009 (64 pgs.).

*Primary Examiner* — John Kwon
(74) *Attorney, Agent, or Firm* — Kevin B. Laurence; Renaissance IP Law Group LLP (57) ABSTRACT

A bi-fuel control system can include an electronic control module and a control unit that are in communication with each other. The system can include a first set of fuel injectors that are configured to deliver a primary fuel to an engine and can include a second set of fuel injectors that are configured to deliver a secondary fuel to the engine. The bi-fuel control system can operate in either a primary operational state in which the first set of injectors is used or a secondary operational state in which the second set of injectors is used. In either operational state, the electronic control module can control the respective set of injectors independently from the control unit.

25 Claims, 10 Drawing Sheets

(56) References Cited

U.S. PATENT DOCUMENTS

| | | | |
|---|---|---|---|
| 5,887,799 A | 3/1999 | Smith | |
| 6,035,837 A | 3/2000 | Cohen et al. | |
| 6,050,237 A | 4/2000 | Ferrera et al. | |
| 6,050,246 A | 4/2000 | Abdelmesih | |
| 6,105,561 A | 8/2000 | Ferrera et al. | |
| 6,250,260 B1 | 6/2001 | Green | |
| 6,431,471 B2 | 8/2002 | Anzinger et al. | |
| 6,457,463 B1 | 10/2002 | McChesney et al. | |
| 6,494,190 B1 | 12/2002 | Cohen | |
| 6,543,395 B2 | 4/2003 | Green | |
| 6,543,423 B2 | 4/2003 | Dobryden et al. | |
| 6,550,459 B2 | 4/2003 | Gibson | |
| 6,588,406 B2 | 7/2003 | Oprea | |
| 6,591,817 B2 | 7/2003 | Deutsch | |
| 6,668,804 B2 | 12/2003 | Dobryden et al. | |
| 6,687,597 B2 | 2/2004 | Sulatisky et al. | |
| 6,845,608 B2 | 1/2005 | Klenk et al. | |
| 6,863,034 B2 | 3/2005 | Kern et al. | |
| 6,988,492 B2 * | 1/2006 | Shetley | F02D 19/066 123/525 |
| 7,121,254 B2 * | 10/2006 | Wickman | F02D 19/081 123/304 |
| 7,228,841 B2 | 6/2007 | Takemoto et al. | |
| 7,546,834 B1 | 6/2009 | Ulrey et al. | |
| 7,559,316 B2 | 7/2009 | Matsushita et al. | |
| 7,603,981 B2 | 10/2009 | Tanaka | |
| 7,673,613 B2 | 3/2010 | Yamashita | |
| 7,685,997 B2 * | 3/2010 | Zanotti | F02D 41/0025 123/431 |
| 7,832,260 B2 | 11/2010 | Tanaka | |
| 2002/0003170 A1 | 1/2002 | Anzinger et al. | |
| 2002/0007805 A1 | 1/2002 | Green | |
| 2002/0096154 A1 | 7/2002 | Gibson | |
| 2002/0195088 A1 | 12/2002 | Oprea | |
| 2003/0015178 A1 | 1/2003 | Dobryden et al. | |
| 2003/0131827 A1 | 7/2003 | Dobryden et al. | |
| 2004/0025831 A1 * | 2/2004 | Landi | F02D 19/02 123/304 |
| 2004/0139943 A1 | 7/2004 | Kern et al. | |
| 2004/0139944 A1 | 7/2004 | Nakano et al. | |
| 2005/0273246 A1 * | 12/2005 | Griese | F02B 69/02 701/113 |
| 2006/0101823 A1 | 5/2006 | Takemoto et al. | |
| 2006/0293829 A1 | 12/2006 | Cornwell et al. | |
| 2007/0062496 A1 | 3/2007 | Snower et al. | |
| 2008/0022982 A1 | 1/2008 | Kamiyama | |
| 2008/0135001 A1 | 6/2008 | Dingle | |
| 2008/0271709 A1 | 11/2008 | Dingle | |
| 2008/0295493 A1 | 12/2008 | Applegate | |
| 2008/0302338 A1 | 12/2008 | Zanotti et al. | |
| 2009/0030588 A1 | 1/2009 | Yamashita | |
| 2009/0031704 A1 | 2/2009 | Tanaka | |
| 2009/0031987 A1 | 2/2009 | Tanaka | |
| 2009/0055079 A1 | 2/2009 | Tanaka | |
| 2009/0071452 A1 | 3/2009 | Phlips et al. | |
| 2009/0071453 A1 | 3/2009 | Stockhausen et al. | |
| 2009/0088983 A1 | 4/2009 | Bauer et al. | |
| 2009/0158831 A1 | 6/2009 | Cornwell et al. | |
| 2009/0165435 A1 | 7/2009 | Koranek | |
| 2009/0260606 A1 | 10/2009 | Stockhausen et al. | |
| 2009/0281709 A1 | 11/2009 | Mallebrein et al. | |
| 2010/0120562 A1 | 5/2010 | Kadokawa et al. | |
| 2010/0194553 A1 | 8/2010 | Mitzutani et al. | |
| 2010/0197449 A1 | 8/2010 | Imamura et al. | |
| 2010/0235073 A1 | 9/2010 | Pontoppidan et al. | |
| 2010/0251993 A1 | 10/2010 | Sugiyama | |
| 2010/0258094 A1 | 10/2010 | Hull et al. | |
| 2010/0264162 A1 | 10/2010 | Cratensburg et al. | |
| 2010/0288569 A1 | 11/2010 | Fish | |
| 2010/0299047 A1 | 11/2010 | Kratt et al. | |
| 2010/0307614 A1 | 12/2010 | Basaglia | |
| 2010/0312453 A1 | 12/2010 | Smither | |
| 2010/0312459 A1 | 12/2010 | Utsumi | |
| 2010/0332104 A1 | 12/2010 | Griese | |
| 2011/0010030 A1 | 1/2011 | Yamamoto | |
| 2011/0011369 A1 | 1/2011 | Jaasma et al. | |
| 2011/0023833 A1 | 2/2011 | Chamarthi et al. | |
| 2011/0046865 A1 | 2/2011 | von Beck | |
| 2011/0073072 A1 | 3/2011 | Rumbel et al. | |
| 2011/0079197 A1 | 4/2011 | Stewart | |
| 2011/0079201 A1 | 4/2011 | Peters | |
| 2011/0088395 A1 | 4/2011 | McNeil | |

FOREIGN PATENT DOCUMENTS

| | | |
|---|---|---|
| JP | H08270474 A | 10/1996 |
| JP | 2003206772 A | 7/2003 |
| JP | 2004124891 A | 4/2004 |
| JP | 2004211610 A | 7/2004 |
| JP | 2004239114 A | 8/2004 |
| JP | 2004239213 A | 8/2004 |
| JP | 2004257304 A | 9/2004 |
| JP | 2004346815 A | 12/2004 |
| JP | 2004346841 A | 12/2004 |
| JP | 2004346842 A | 12/2004 |
| JP | 2005061401 A | 3/2005 |
| JP | 2005214079 A | 8/2005 |
| JP | 2005233059 A | 9/2005 |
| JP | 2006077656 A | 3/2006 |
| JP | 2006266160 A | 10/2006 |
| JP | 2006329165 A | 12/2006 |
| JP | 2006342689 A | 12/2006 |
| JP | 2007239476 A | 9/2007 |
| JP | 2008232043 A | 10/2008 |
| JP | 2009024533 A | 2/2009 |
| WO | WO 02101213 A1 | 12/2002 |
| WO | WO 2010129733 A1 | 11/2010 |

* cited by examiner

BI-FUEL CONTROL SYSTEMS FOR AUTOMOTIVE VEHICLES AND RELATED METHODS

CROSS REFERENCE TO RELATED APPLICATIONS

This application claims the benefit under 35 U.S.C. §119 (e) of U.S. Provisional Patent Application No. 61/333,184, titled BI-FUEL ENGINE CONTROL SYSTEM AND PROCESS, which was filed on May 10, 2010, the entire contents of which are hereby incorporated by reference herein.

TECHNICAL FIELD

The present disclosure relates generally to fuel systems and relates more particularly to bi-fuel control systems and processes for automotive vehicles.

BACKGROUND OF THE INVENTION

Certain known aftermarket bi-fuel systems are configured to selectively switch between the primary and secondary sources of fuel, as desired, and even while the engine is running. However, these systems can be very intrusive to the factory installed portions of the engine and its control components.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Embodiments disclosed herein can be used in retrofitting an automotive vehicle (e.g., car, truck, or van) to operate on more than one fuel source. For example, the automotive vehicle may originally be configured to operate using a primary, stock, or original fuel source, such as a liquid source of fuel (e.g., gasoline or diesel fuel), in its internal combustion engine. Secondary fuel conversion kits can include added components that permit the vehicle to selectively use either the original fuel source or a secondary or alternative fuel source, such as a gaseous source of fuel (e.g., compressed natural gas, propane, or hydrogen fuel) or other source of fuel, in the internal combustion engine.

Certain known aftermarket bi-fuel systems are configured to selectively switch between the primary and secondary sources of fuel, as desired, and even while the engine is running. However, these systems can be very intrusive to the factory installed portions of the engine and its control components. Various systems can alter the factory settings that are used for operation of the primary fuel. For example, some systems may alter certain OBD-II trip code values of the factory installed electronic control unit, or electronic control module (ECM), to allow the secondary fuel to work efficiently in the engine. By way of illustration, some systems can modify engine temperature values, where the secondary fuel is compressed natural gas. Other or further systems may provide a separate electronic control unit that is installed in the vehicle and which is used to control operation of gaseous fuel injectors. Systems of this variety splice into the factory installed wiring harness in order to receive inputs from various sensors and controllers and so as to intercept signals from the ECM. Such systems can be complicated to install and can be disruptive of the primary fuel delivery system's original settings.

Certain embodiments described herein can reduce or eliminate one or more of the shortcomings of traditional secondary fuel conversion kits, such as those just discussed. For example, in some embodiments, a control unit is provided that is configured to communicate with the factory ECM via a factory installed OBD-II port. The control unit can download and store all of the original or stock information (i.e., programming, instructions, codes, tables, values, and/or other data) that the ECM uses to control operation of the engine on the primary fuel. The control unit can additionally have stored therein the information (i.e., programming, instructions, codes, tables, values, and/or other data) that can be used to operate the engine on the secondary fuel. The control unit can be used to program the factory ECM to operate on one of the primary and secondary fuels by uploading to the factory ECM the appropriate set of information. Accordingly, the vehicle can be programmed to operate either as a primary fuel vehicle or as a secondary fuel vehicle. Moreover, when the vehicle operates as a primary fuel vehicle, all of the stock information is used in its original and unaltered form. Additionally, in certain embodiments, the control unit does not directly control fueling of the engine. Rather, the factory ECM controls the fueling, whether the vehicle is operating in a primary fuel mode or in a secondary fuel mode. The control unit is thus nonintrusive relative to the operation of the factory ECM.

For example, in certain embodiments, the control unit does not require that the wiring harness be spliced so as to add a controller for the secondary fuel injectors. One or more of the foregoing advantages and/or other or further advantages will be apparent from the present disclosure.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also include a computer program product including a non-transitory, machine-readable medium having stored thereon instructions that may be used to program a computer (or other electronic device) to perform the processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/computer-readable medium suitable for storing electronic instructions.

Figure 1:
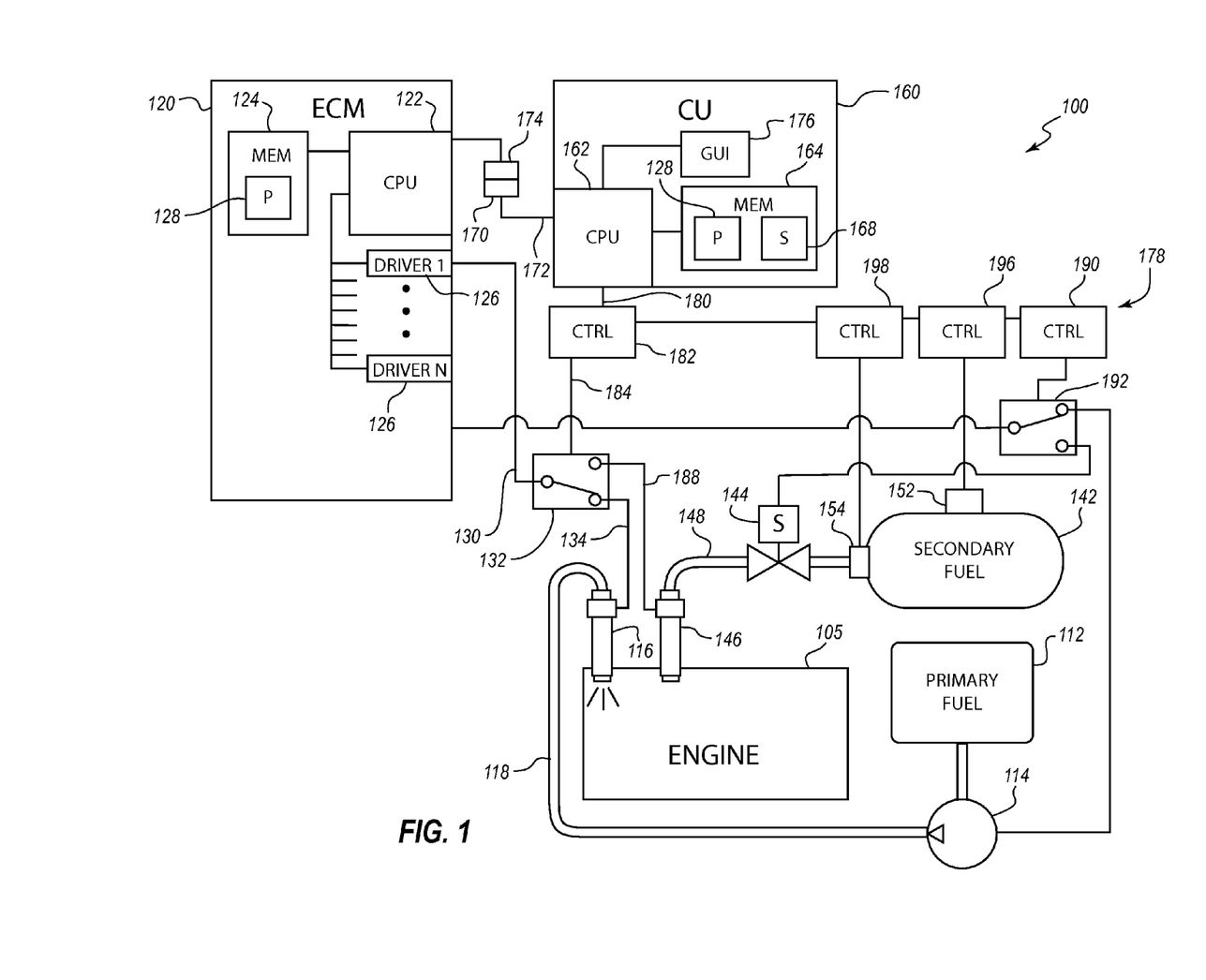
FIG. 1 is a schematic diagram of an embodiment of a bi-fuel control system for an automotive vehicle shown in an operative state that is configured to use a primary source of fuel.

FIG. 1 schematically illustrates an embodiment of a bi-fuel control system 100 that can be installed in an automotive vehicle so as to operate an internal combustion engine 105 thereof. The system 100 includes a factory installed primary fuel tank 112, primary fuel pump 114, and series of primary fuel injectors 116 that are interconnected by a fuel line 118. For purposes of clarity, only one fuel injector 116 is shown, but it is understood that a separate fuel injector 116 can be provided for each cylinder of the engine 105. The primary fuel can be, for example, a liquid fuel (e.g., gasoline or diesel).

The system 100 further includes a factory installed electronic control unit or electronic control module (ECM) 120. The ECM 120 can be configured to control various functions of the vehicle, such as fuel injection. For example, the ECM 120 can be configured to control the operation of each fuel injector 116, and may be configured to control other components associated with fuel injection (not shown). In the illustrated embodiment, the ECM 120 includes a central processing unit (CPU) 122 that is communicatively coupled with a memory device 124 and a series of fuel injector drivers 126. There can be one fuel injector driver 126 for each primary fuel injector 116. For example, when the engine 105 is a V8 engine, there may be eight fuel injector drivers 126.

The memory device 124 can have stored therein a set of stock, original, or primary fuel information 128, which can include any suitable programming, instructions, codes, tables, values, program calibrations, and/or other data that is needed or desired for the engine 105 to properly operate on the primary fuel. The primary fuel information 128 is factory installed and is used by the CPU 122 to operate the factory installed fuel system and the engine 105 in a desired fashion. For example, the primary fuel information 128 may be configured such that the vehicle meets certain emission standards. The terms "factory installed fuel system" and "primary fuel system" include, for example, the fuel tank 112, the fuel pump 114, and the fuel injector 116, and can further include additional components (e.g., intake manifold, sensors, etc.) that are not shown.

By way of example, in the factory installed fuel system, each driver 126 is directly connected with each primary fuel injector 116 via a first communication line 130 so as to provide signals to the injector 116. The CPU 122 can determine such parameters as the pulse width and pulse timing for each pulse delivered by the drivers 126 to the fuel injectors 116. In the bi-fuel control system 100, however, drivers 126 are indirectly coupled with the primary fuel injectors 116. In particular, each communication line 130 is coupled to a switch 132, rather than directly to the fuel injector 116, and each switch 132 is coupled with a primary fuel injector 116 via a second communication line 134. However, as further discussed below, the drivers 126 can directly control the fuel injectors 116 when the switch 132 is in the appropriate orientation. Additionally, when the switch 132 is in the appropriate orientation, drivers 126 also control the secondary fuel injectors 146 because the switch 132 and the secondary fuel injectors are coupled to a third communication line 188.

The switch 132 and the second communication line 134 can be provided as part of a retrofitted or aftermarket secondary fuel conversion kit, or stated otherwise, can be a part of a "secondary fuel system." The bi-fuel control system 100 includes both the primary fuel system (or factory installed fuel system) and the secondary fuel system. Additional components of such a secondary fuel system, and also of the bi-fuel control system 100, will now be described.

With continued reference to FIG. 1, the system 100 further includes a secondary fuel tank 142, a valve system or valve 144, and a series of secondary fuel injectors 146 that are interconnected by a fuel line 148. Again, for purposes of clarity, only one secondary fuel injector 146 is shown, but it is understood that a separate fuel injector 146 can be provided for each cylinder of the engine 105. The secondary fuel can be, for example, a gaseous fuel (e.g., compressed natural gas or propane).

In some embodiments, a temperature transducer 152 can be coupled with the secondary fuel tank 142. In the illustrated embodiment, the temperature transducer 152 is positioned at a surface of the fuel tank 142, although other locations are also possible. In other or further embodiments, a pressure transducer 154 is provided in line with the fuel tank 142. The transducers 152, 154 will be discussed further hereafter.

The system 100 further includes a control module or control unit 160, which can include a CPU 162 that is communicatively coupled with a memory device 164. The memory device 164 can have stored therein one or more sets of secondary fuel information 168 that can be transferred from the control unit 160 to the ECM 120, as further discussed below. The secondary fuel information 168 can include any suitable programming, instructions, codes, tables, values, program calibrations, and/or other data that is needed or desired for the engine 105 to properly operate on the secondary fuel. In the illustrated embodiment, only a single set of secondary fuel information 168 is shown stored in the memory device 164. This information 168 may be specific to the vehicle in which the control unit 160 is installed (e.g., may be specific to the make, model, and year of the vehicle). In other embodiments, additional sets of information 168 may be stored in the memory 164, each of which may be configured for different type of vehicles, such that a user may select only the one appropriate set of information 168 from among the library of options when preparing the system 100 for operation in a secondary fuel mode.

The information 168 can be used by the system 100 to operate the vehicle at a desired performance level using the secondary fuel. For example, the information 168 may include the proper operational parameters and calibrations for energizing the fuel injectors 146 in a manner that optimizes operation of the engine 105 on the secondary fuel and within the confines of emissions requirements. Accordingly, in some instances, each set of information 168 may be certified by an appropriate authority for use with a specific vehicle, such that the vehicle is calibrated to meet emission requirements when it operates on the secondary fuel.

As shown in FIG. 1, the memory device 164 can also have stored therein an exact copy of the primary fuel information 128. In some embodiments, the control unit 160 downloads the information 128 from the ECM. For example, the control unit 160 can be communicatively coupled with the ECM 120 in any suitable manner. As further discussed hereafter, in some embodiments, the control unit 160 can be coupled with an OBD-II port 170 of the vehicle, such as via a cable 172 with a suitable connector 174. The control unit 160 can be configured to unlock the ECM 120, in some instances, so as to download and store the primary fuel information 128. In other instances, the primary fuel information 128 may not be protected such that it may be downloaded without unlocking the ECM 120.

As further discussed below, the control unit 160 can be used to selectively transition the vehicle from operation as a primary fuel vehicle (i.e., a vehicle that runs on the primary fuel) to operation as a secondary fuel vehicle (i.e., a vehicle that runs on the secondary fuel), and may upload the secondary fuel information 168 to the ECM 120 in order to do so. Similarly, the control unit 160 can be used to selectively transition the vehicle from operation as a secondary fuel vehicle to operation as a primary fuel vehicle, and may upload the primary fuel information 128 to the ECM 120 in order to do so.

The control unit 160 can further include any suitable user interface by which a user can provide instructions or other to the control unit 160 and select or direct the operations thereof. For example, the user can instigate transition of the vehicle from one operational state to another operational state via the user interface. By way of illustration, a user may select from a menu or in any other suitable manner the fuel type that the user wishes to use. The user thus may select either the primary fuel or the secondary fuel, and can thereby select operation of the vehicle in one of the primary fuel state and the secondary fuel state. In the illustrated embodiment, the user interface comprises a touch-screen graphical user interface 176 that is mounted in the cab of a vehicle, although other arrangements are possible. Other operations of the control unit 160 and the displays that may be provided at the graphical user interface 160 are discussed further below.

In certain embodiments, the control unit 160 can further be coupled with a bus 178 so as to communicate with other components of the system 100. In the illustrated embodiment, the control unit 160 is coupled to the bus 178 via another cable 180 that is separate from the cable 172 by which the control unit 160 is coupled to the OBD-II port 170. Any suitable architecture of and communication standard for the bus 178 is possible. In some embodiments, the bus 178 comprises a controller-area network (CAN) that conforms to CAN-bus protocols or standards. In other embodiments, the control unit 160 may communicate with one or more components of the system 100 individually.

The control unit 160 can be communicatively coupled with a controller 182, which may be a CAN controller, that is configured to operate the switch 132, via a fourth communication line 184, based on information retrieved from a data stream through the bus 178. In particular, the controller 182 can retrieve from the data stream information regarding the operational state of the vehicle—i.e., whether the vehicle is to be operated in the primary fuel state or in the secondary fuel state. When the control unit 160 indicates that the primary fuel state is to be used, the switch 132 can be oriented so as to deliver signals from the drivers 126 of the ECM 120 to the primary fuel injectors 116. In some embodiments, a separate switch 132 may be used for each pair of primary and secondary fuel injectors 116, 118, and a separate controller 182 can operate each such switch 132. In other embodiments, a separate switch 132 may be used for each pair of primary and secondary fuel injectors 116, 118, and a single controller 182 can operate all of the switches 132. In still other embodiments, a single switch 132 may be used for each pair of primary and secondary fuel injectors 116, 118, and a single controller 182 can operate the switch 132.

The control unit 160 can be communicatively coupled with a controller 190 that is configured to operate a switch 192 based on information retrieved from the data stream through the bus 178. As with the controller 182 and other controllers discussed herein, the controller 190 can be a CAN controller. The controller 190 can retrieve from the data stream information regarding the operational state of the vehicle—i.e., whether the vehicle is to be operated in the primary fuel state or in the secondary fuel state. When the control unit 160 indicates that the primary fuel state is to be used, the switch 192 can be oriented such that the primary fuel pump 114 can receive power from the ECM 120. Other connections between the ECM 120 and the primary fuel pump 114, which are not illustrated, are unaffected by the presence of the secondary fuel system (e.g., the control unit 176 and all components connected thereto).

Accordingly, once the controller 182 has operated the switch 132 into the primary fuel state and the controller 190 has operated the switch 192 into the primary fuel state, the control unit 160 does not have any effect on the operation of the primary fuel system. That is, the ECM 120 directly controls operation of the fuel injectors 116 and the fuel pump 114, and does so independently of the control unit 160 (e.g., without the control unit 160 controlling these components), or in the manner it would in the absence of the control unit 160. More generally, once the system 100 is in the primary fuel state, the ECM 120 is able to control operation of the primary fuel system in the manner it would in the absence of the control unit 160.

The control unit 160 can further be communicatively coupled with controllers 196, 198, which are communicatively coupled with the temperature transducer 152 and the pressure transducer 154, respectively. The control unit 160 thus can receive data from the transducers 152, 154 via the bus 178, and this data may be displayed to a user via the graphical user interface 176. The control unit 160 thus can permit a user to conveniently view information regarding the temperature and/or pressure of the secondary fuel while the user is within the cab of the vehicle.

As can be appreciated from the foregoing discussion, FIG. 1 illustrates the system 100 in the primary fuel operation mode. The control unit 160 can be used to transition the vehicle from the primary fuel operation mode to the secondary fuel operation mode. And, thereafter, the control unit 160 can also be used to transition the vehicle back from the secondary fuel operation mode to the primary fuel operation mode. Such operations may be referred to as flashing or reflashing the ECM 120.

When transitioning the vehicle back to the primary fuel operation mode, it can be desirable to use the stock information 128 of the ECM 120. As previously noted, in some embodiments, this stock information 128 can be downloaded directly from the ECM 120. Accordingly, in some embodiments, after initial installation of the control unit 160, it can be desirable to download the stock information 128 and store it in the memory device 164 prior to transitioning the vehicle into the secondary fuel operation mode.

In other or further embodiments, it may be possible to download the stock information 128 from another source, such as the Internet. Accordingly, in some embodiments, the control unit 160 may include a data port 334 (see FIG. 5), such as an Ethernet port or a USB port, via which the stock information 128 can be downloaded. In some embodiments, the secondary fuel information 168 may be preloaded into the memory device 164 of the control unit 160. In other or further embodiments, the secondary fuel information 168 may be downloaded from another source.

To transition the system 100 to the secondary fuel mode, a user can select the secondary fuel from a menu via the GUI 176. In certain embodiments, this transition can take place while the engine is off. The vehicle key can be in the ON position, however, so as to provide power the control unit 160 and the ECM 120. The control unit 160 can transition the system 100 to the configuration shown in FIG. 2. Thereafter, the vehicle can be started so that the engine runs on the secondary fuel. In such configurations, the system 100 can cause the vehicle to either be a dedicated primary fuel vehicle (e.g., a gasoline vehicle) or a dedicated secondary fuel vehicle (e.g., a compressed natural gas vehicle). It may be stated that the fuel selection process converts the vehicle from one operational mode to another, or from one vehicle type to another. Further, the fuel selection process can be said to reboot the ECM 120, which may take at least a small period of time (e.g., no fewer than about 10, 15, 20, 25, or 30 seconds). Selection of a fuel source thus can be a deliberate action performed by a user.

When the secondary fuel source is selected, the control unit 160 can upload the secondary fuel information 168 (denoted with an "S") into the memory device 124, so as to replace the primary fuel information 128 (denoted with a "P" in FIG. 1). The CPU 122 can then operate using the secondary fuel information 168.

Figure 2:
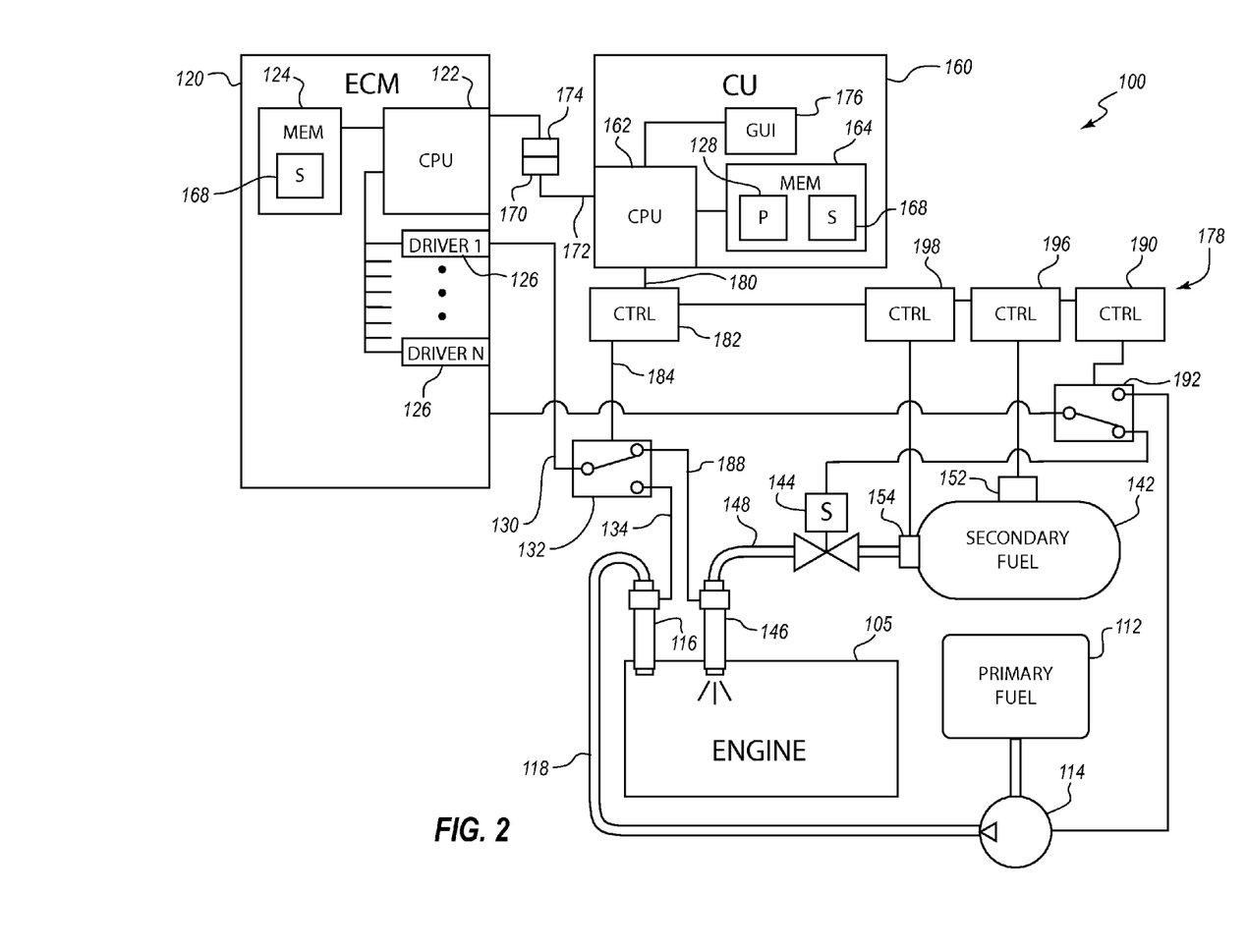
FIG. 2 is a schematic diagram of the bi-fuel control system of FIG. 1 shown in an operative state that is configured to use a secondary source of fuel.

The controller 182 can retrieve from the data stream information regarding operational state of the vehicle—in particular, that the user has selected to use the secondary fuel source and that the vehicle is now to be operated in a secondary fuel mode. The controller 182 thus can reorient the switch 132 so as to deliver signals from the drivers 126 of the ECM 120 to the secondary fuel injectors 146. Thus, the secondary fuel injectors 146 can be controlled directly by the ECM 120. Stated otherwise, once the controller 182 has operated the switch 132 into the secondary fuel state, the control unit 160 does not have any effect on the operation of the fuel injectors 146. Moreover, other vehicle systems that might be operated by the ECM 120 are unaltered by the control unit 160. Certain embodiments of system 100 thus can be particularly desirable in aftermarket configurations, as the factory wiring harness is left undisturbed and/or the factory ECM 120 is allowed to operate in its usual fashion.

The controller 190 likewise can retrieve from the data stream information regarding the operational state of the vehicle—i.e., that the vehicle is to be operated in the secondary fuel state. Under these conditions, the switch 192 is oriented such that the primary fuel pump 114 does not receive power from the ECM 120, and rather, that the valve 144 (which may be a solenoid valve) does. Accordingly, the primary fuel will not be pumped through the fuel line 118, whereas the secondary fuel is permitted through the fuel line 148 for operation of the engine 105. Again, the ECM 120 thus can be permitted to operate in its usual fashion, even while operating in the secondary fuel mode.

After the system 100 has operated in the secondary fuel mode, the system may be returned to the primary fuel mode. For example, a user may select the primary fuel mode from menu, which can return the system 100 to the configuration shown in FIG. 1. The control unit 160 can "reflash" the ECM 120 by uploading the original stock information 128 into the memory device 124, which may replace the secondary fuel information 168.

Figure 3:
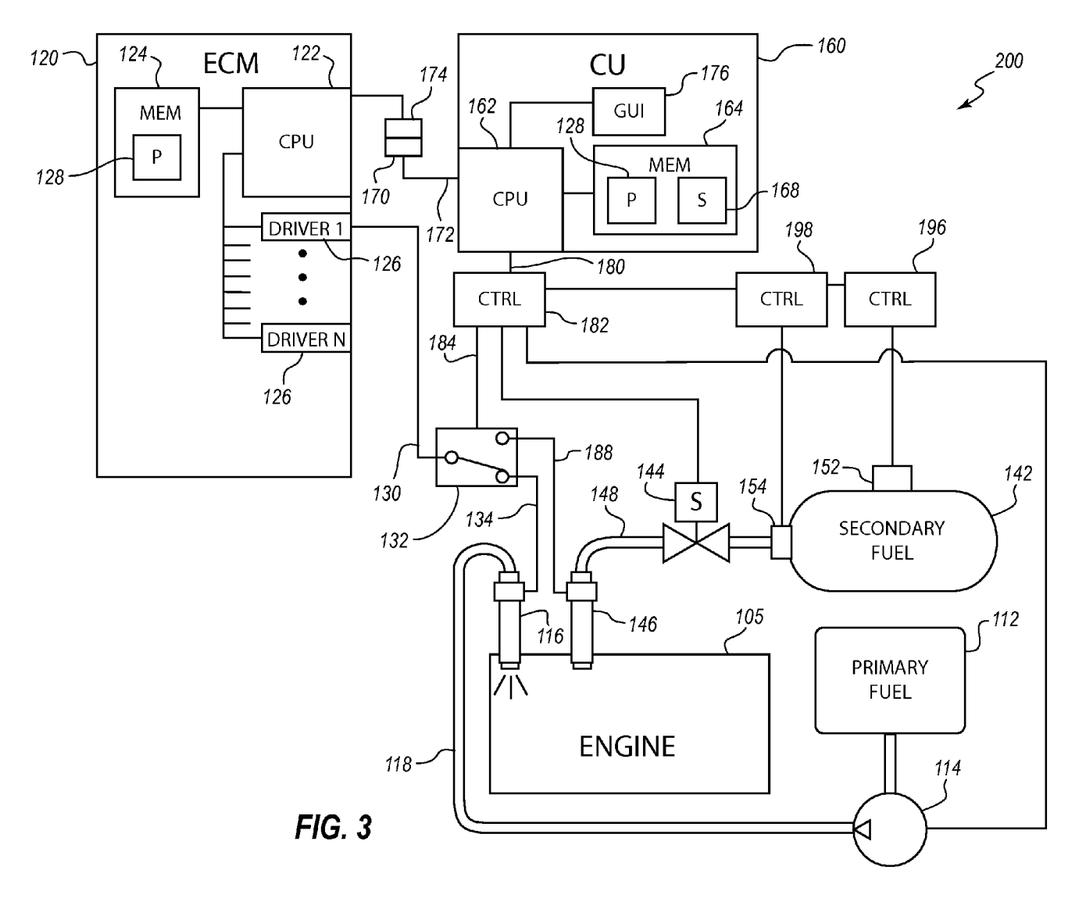
FIG. 3 is a schematic diagram of another embodiment of a bi-fuel control system for an automotive vehicle shown in an operative state that is configured to use a primary source of fuel.

FIG. 3 illustrates another embodiment of a bi-fuel control system 200 that can resemble the system 100 in many respects. Like reference numerals represent like features. In the system 200, the controller 190 and the switch 192 are not used. Rather, the controller 182 is configured to obtain information regarding the operational state of the system 200, and based on this information, is configured to control the switch 132, the fuel valve 144, and the primary fuel valve 114. In still other embodiments, a separate controller may be used for each of the switch 132, the fuel valve 144, and the primary fuel valve 114.

Figure 4:
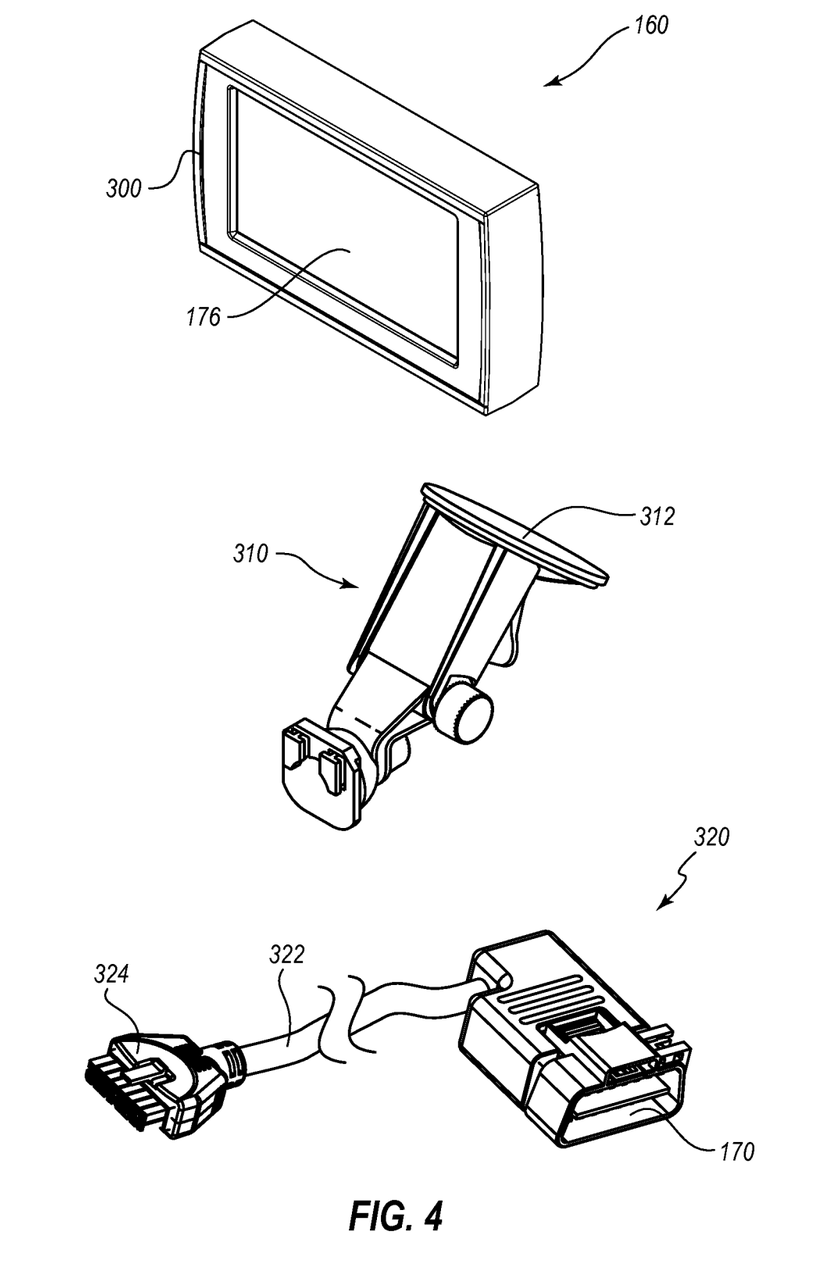
FIG. 4 is an exploded perspective view of various components of a bi-fuel control system that are configured to be positioned within the cab of a vehicle.
Figure 5:
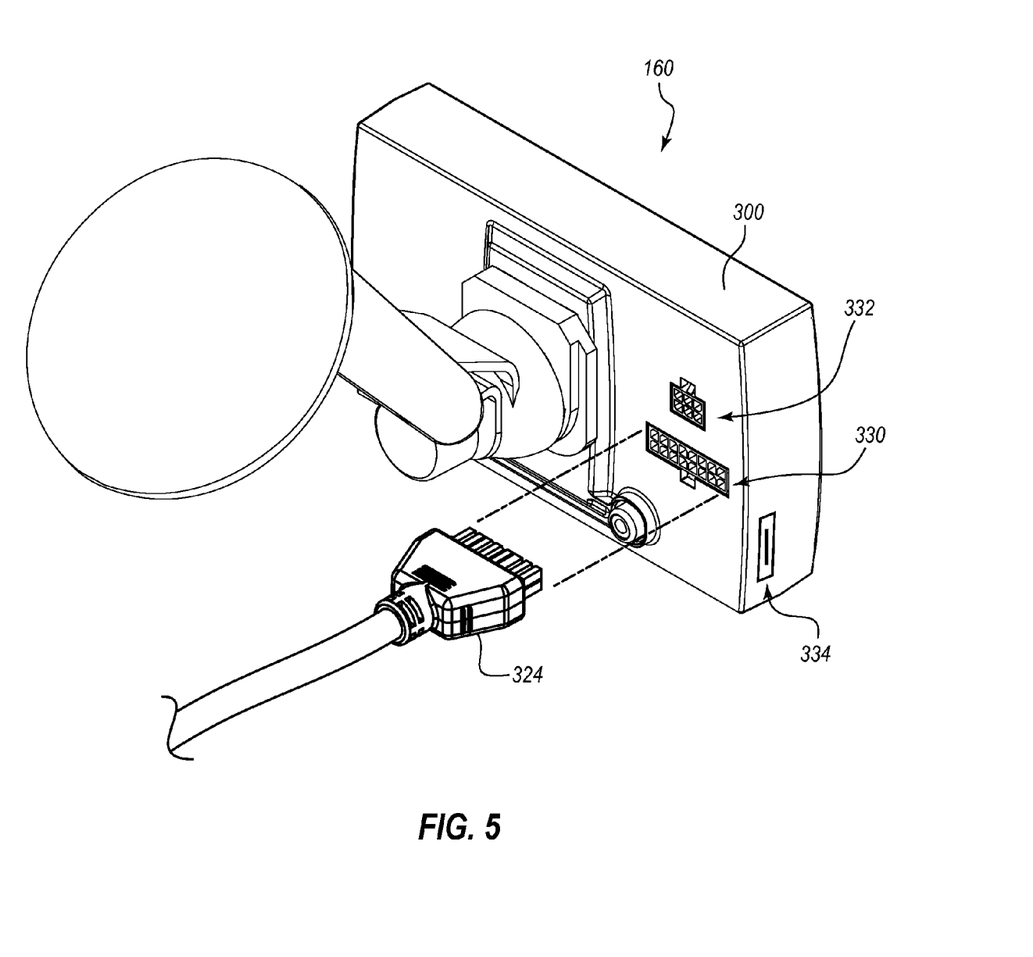
FIG. 5 is a perspective view of the components shown in FIG. 4.
Figure 7:
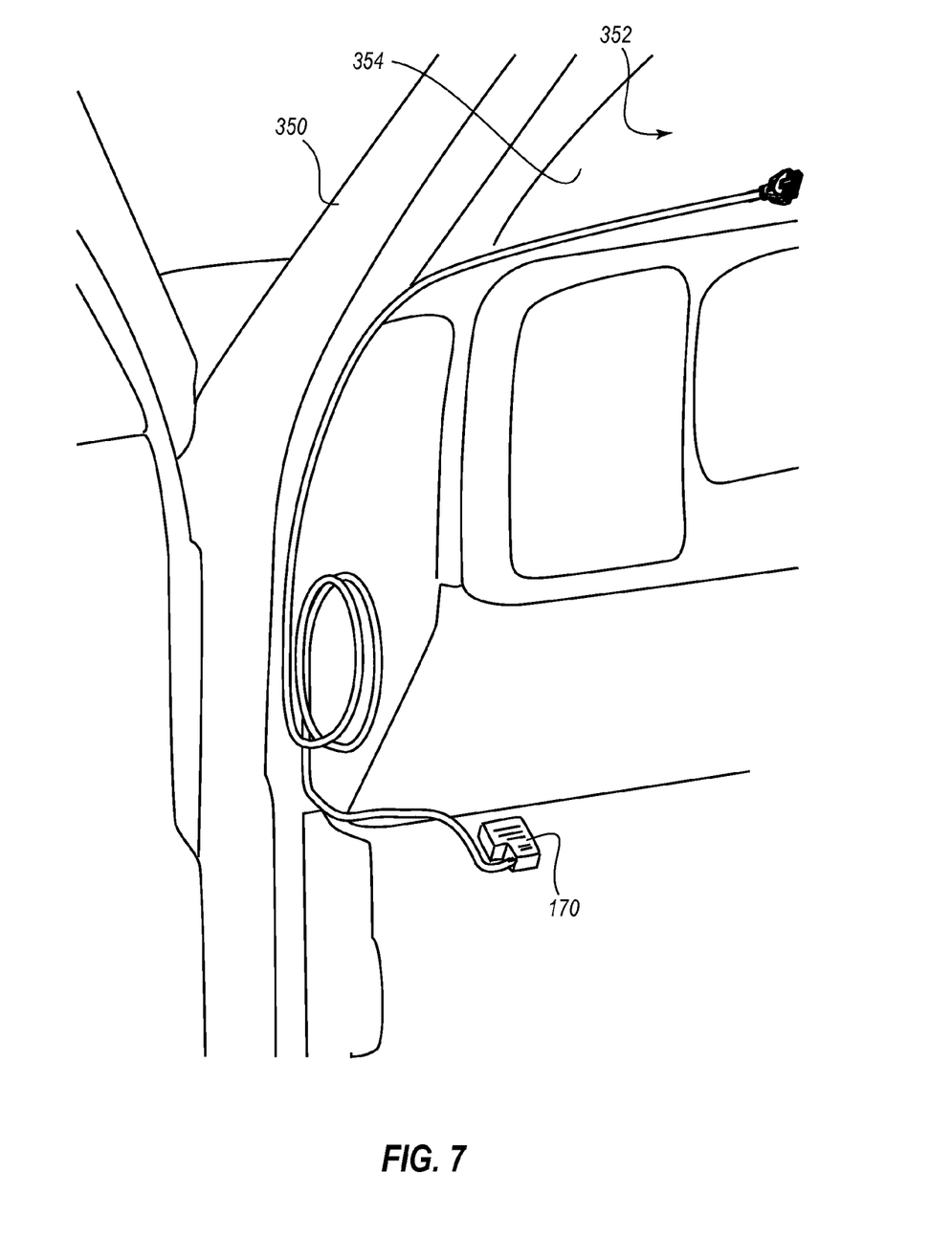
FIG. 7 is a perspective view of an embodiment of a cable coupled with an OBD-II port of a vehicle.

FIGS. 4, 5, and 7 illustrate embodiments of components of the systems 100, 200 that are configured to be positioned with the cab 352 of a vehicle 350. The illustrated embodiment of the control unit 160 comprises a touchscreen display unit 300. The screen portion of the display unit 300 thus may function as the GUI 176. The display unit device 300 can define any suitable number of ports 330, 332, 334. In the illustrated embodiment, the port 330 is an OBD-II port, the port 332 is a CAN-bus port, and the port 334 is a USB port. The GUI 176 can display a variety of information regarding operation of the systems 100, 200, including any information that is received via any of the ports 330, 332, 334.

A mounting bracket 310 of any suitable variety may be used with the display unit 300. In the illustrated embodiment, the bracket 310 includes a suction cup 312 by which the assembly can be mounted to the windshield 354 of the vehicle 350. Other suitable mounting arrangements are contemplated.

An OBD-II cable device 320 can be configured to provide communication between an OBD-II port 174 and the display unit 300. The cable device 320 can include a female OBD-II connector 170 and a male OBD-II connector that are joined by a length of cable 322.

Figure 6:
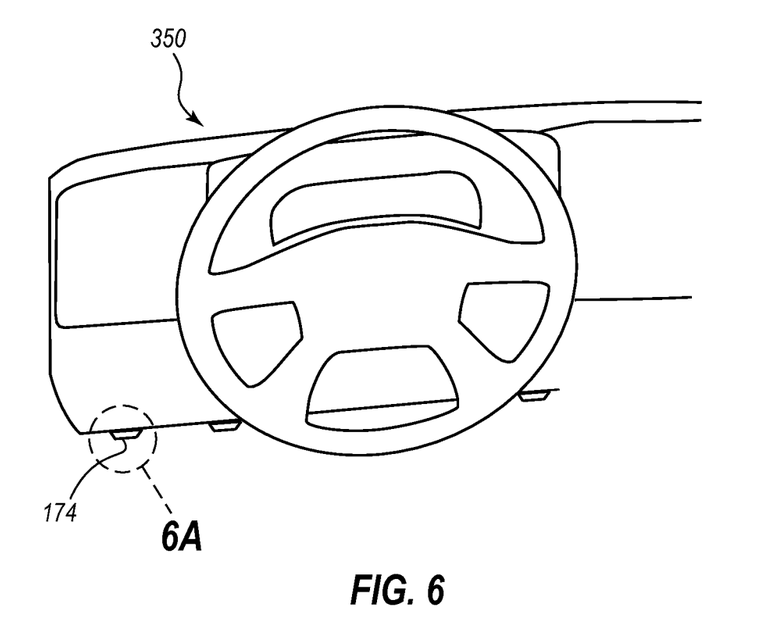
FIG. 6 is a perspective view of a dashboard illustrating possible locations of an OBD-II port.
Figure 6A:
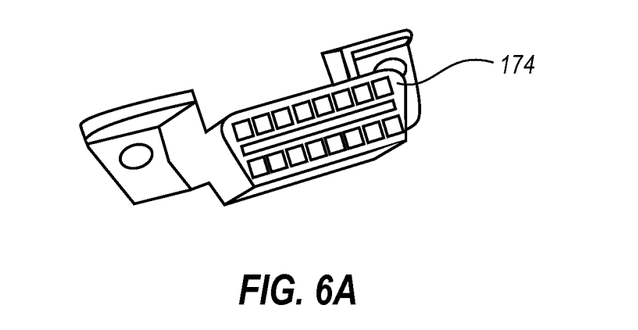
FIG. 6A is a perspective view of an OBD-II port.
Figure 8:
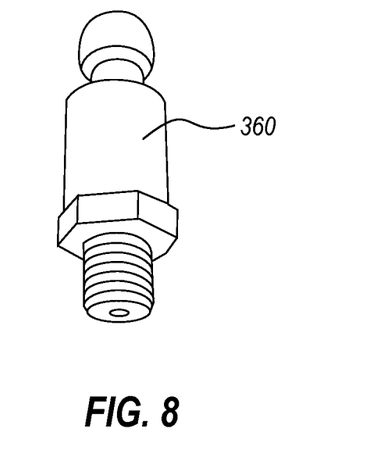
FIG. 8 is a perspective view of an embodiment of a pressure transducer that is compatible with embodiments of a bi-fuel control system.
Figure 9:
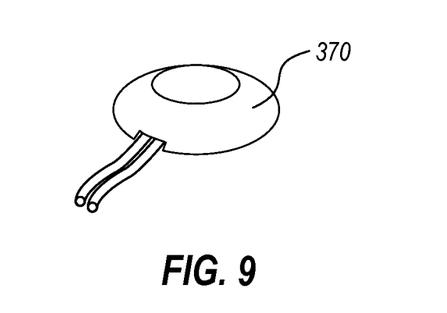
FIG. 9 is a perspective view of an embodiment of a temperature transducer that is compatible with embodiments of a bi-fuel control system.
Figure 10:
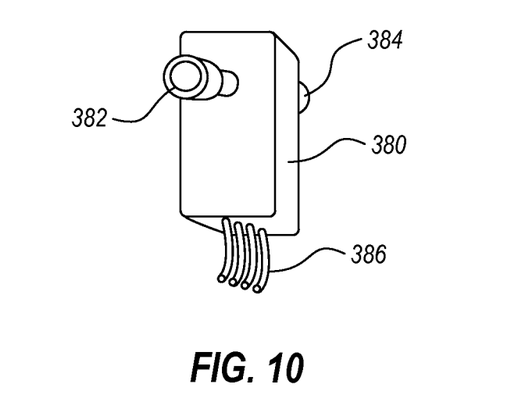
FIG. 10 is a perspective view of an embodiment of a controller that is compatible with embodiments of a bi-fuel control system.

FIG. 6 illustrates various positions at which an OBD-II port may be located on various dashboards. FIG. 7 illustrates a wire routing arrangement that is possible for the cable device 320, where the OBD-II connector 170 is coupled with an OBD-II port. FIGS. 8-9 illustrate embodiments of a pressure transducer 360, a temperature transducers 370, and a CAN controller 380 that can be used with embodiments of the systems 100, 200. In some embodiments, the CAN controller 380 includes input and output connectors 382, 384 and communication wiring 386.

Figure 11:
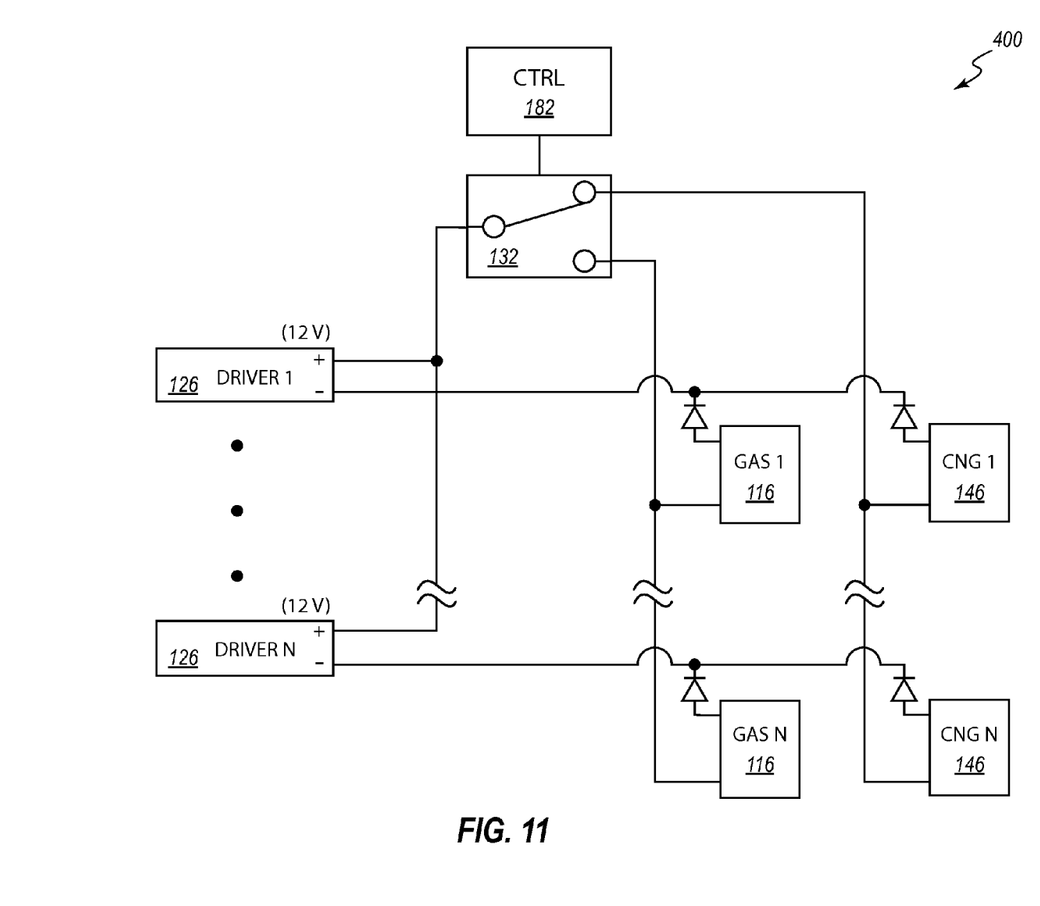
FIG. 11 is a schematic wiring diagram of an embodiment of a wiring harness that is compatible with embodiments of a bi-fuel control system, wherein the wiring harness is coupled with portions of a bi-fuel control system that is in a secondary fuel operational mode.
Figure 12:
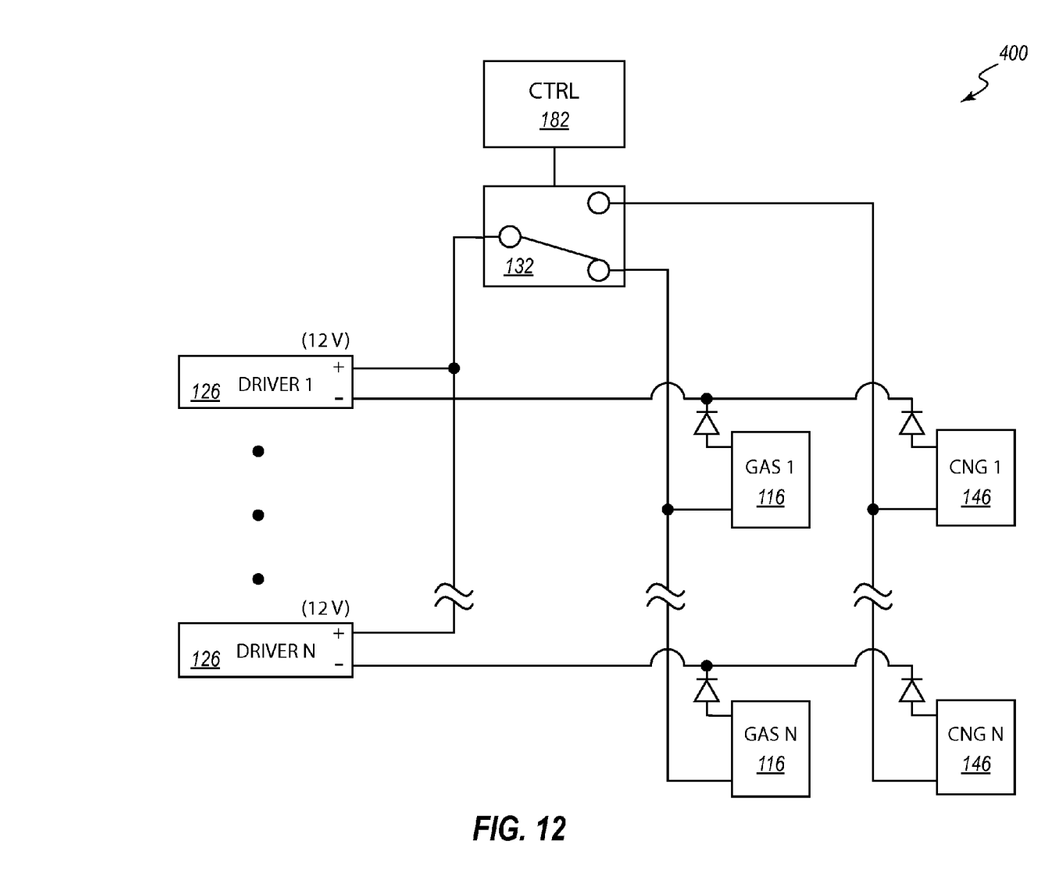
FIG. 12 is a schematic wiring diagram of the wiring harness of FIG. 11 coupled with portions of a bi-fuel control system that is in a primary fuel operational mode.

FIGS. 11 and 12 schematically illustrate wiring diagrams of an embodiment of a wiring harness 400 that is compatible with embodiments of the systems 100, 200. In FIG. 11, the bi-fuel control system into which the wiring harness 400 is incorporated is configured to operate using a secondary fuel, whereas the bi-fuel control system is configured to operate using a primary fuel in FIG. 12. Wiring for only two sets of primary and secondary fuel injectors 116, 146 is shown, but the disclosure is sufficient to illustrate how the wiring would be arranged for additional sets of fuel injectors 116, 146.

In the illustrated embodiment, the wiring harness 400 is configured such that, when it is attached to the drivers 126, the positive terminals of the drivers 126 are all coupled with each other. Similarly, the positive terminals of all of the primary fuel injectors 116 are coupled with each other, and the positive terminals of all of the secondary fuel injectors 116 are coupled with each other. The negative terminals of each pair of primary and secondary fuel injectors 116, 146 are connected with each other and with the negative terminal of their associated driver 126. The controller 182 is configured to move the switch so as to complete the circuits between each individual driver 126 and either the set of primary fuel injectors 116 or the set of secondary fuel injectors 146. Accordingly, signals that are delivered by the drivers 126 are either delivered only to the primary fuel injectors 116 or only to the secondary fuel injectors 116, depending on the orientation of the switch 132. Other suitable configurations for the wiring harness 400 are possible.

As can be appreciated from the disclosure herein, various embodiments of the systems 100, 200 can include features that may be advantageous in a variety of contexts. For example, in some embodiments, a bi-fuel control system that maintains all factory installed settings and sensors, with no modifications to any programming when the engine is running on the primary fuel and using the original factory ECU. In other or further embodiments, a bi-fuel system is configured to reprogram the factory ECU with a new calibration table specifically calibrated for a secondary fuel within the fuel composition and is configured to maintain all relevant OBO-II check engine light codes, etc., as designed from the factory. In other or further embodiments, a bi-fuel system is configured to reprogram the factory ECU to switch between the factory primary fuel and the secondary fuel while the engine is OFF and the key is in the ON position. In other or further embodiments, a bi-fuel control system is configured to monitor the onboard diagnostics and display this information in the vehicle cab on a digital screen, which can be convenient for the vehicle user. In other or further embodiments, a bi-fuel control system can include a pressure transducer and/or temperature transducer that monitor the fuel of a secondary fuel tank, and in further embodiments, can display this information. In some embodiments, this information may be provided to the user as a temperature-compensated fuel gauge.

As can be appreciated from the disclosure herein, in various embodiments, a method can include reprogramming a factory ECM to run on an alternative fuel. In some embodiments, when the vehicle key has been turned to the ON position, but with the engine OFF, a user selects from a menu item of either the primary fuel or the secondary fuel. The control device may operate to unlock the ECM, download the existing program calibration to be saved within the device memory, and upload the new program calibration for the selected fuel type.

In some embodiments, a reprogramming event can take no less than about 10, 15, 20, 25, or 30 seconds to complete, or can take no more than about 10, 15, 20, 25, or 30 seconds to complete. In some embodiments, the device may also turn ON or OFF the fuel pump and open or shut a gaseous fuel valve. For example, when the device switches to the use of a gaseous fuel, the device turns OFF the liquid fuel pump and turns the liquid fuel pump ON when switching back to the original liquid fuel. In some embodiments, the device activates a switch that turns OFF the electronic feed to the original injectors and turns ON the electronic feed to the gaseous injectors to switch back to the alternative gaseous fuel. When the fuel is switched back to the original liquid fuel the switches are reversed.

The device may monitor the pressure and temperature of the alternative fuel tank to provide the user with temperature compensated fuel levels within the alternative fuel tank or tanks. Using this pressure and temperature data, the touch screen display may provide a temperature compensated fuel level for the gaseous fuel.

Although much of the foregoing disclosure is discussed in the context of retrofitting a vehicle with a secondary fuel system, it should be appreciated that embodiments may be used as original features of a factory-produced vehicle. For example, the fuel system 200 may be used as a primary fuel system, rather than as a secondary fuel system. Any suitable use of the apparatus, assemblies, systems, and methods discussed herein is contemplated.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Use of the terms "primary" and "secondary" herein is for the sake of convenience and is not intended to limit the scope of the disclosure. For example, in some embodiments, a primary fuel source may be of a gaseous form, whereas a secondary fuel source may be of a liquid form. The terms are not intended to connote any particular preference.

References to approximations are made throughout this specification, such as by use of one or more of the terms "about," "approximately," "substantially," and "generally." For each such reference, it is to be understood that, in some embodiments, the value, feature, or characteristic may be specified without approximation. For example, where such a qualifier is used, the terms includes within its scope the qualified word in the absence of the qualifier.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment. Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The invention claimed is:

1. A bi-fuel control system for an automotive vehicle, the system comprising:
an internal combustion engine;
pairs of fuel injectors, wherein each pair comprises a primary fuel injector configured to deliver a primary fuel to the engine when the system is in a first operational mode and a secondary fuel injector configured to deliver a secondary fuel to the engine when the system is in a second operational mode, wherein each fuel injector has a positive terminal and a negative terminal, wherein the positive terminals of the primary fuel injectors are coupled with each other, and wherein the positive terminals of the secondary fuel injectors are coupled with each other;
an electronic control module, wherein the electronic control module comprises a set of drivers, wherein each driver has a positive terminal and a negative terminal, and wherein the positive terminals of the drivers are coupled with each other, and wherein each negative terminal of each driver is coupled with the negative terminals of one of the pairs of the primary fuel injectors and secondary fuel injectors;
a control unit communicatively coupled with the electronic control module;
a switch; and
a controller coupled with the control unit and the switch, wherein the controller operates the switch into the first operational mode or the second operation mode based on information received from the control unit;
wherein the control unit stores operational information for the first operational mode and operational information for the second operational mode;
wherein the control unit uploads either the operational information for the first operational mode or the operational information for the second operation mode into the electronic control module so as to selectively transition the system back and forth from the first operational mode to the second operational mode or from the second operational mode to the first operational mode;
wherein, when the system is in the first operational mode, the switch establishes communication between the drivers of the electronic control module and the primary fuel injectors and inhibits communication between the drivers of the electronic control module and the secondary fuel injectors;
wherein, when the system is in the second operational mode, the switch establishes communication between the drivers of the electronic control module and the secondary fuel injectors and inhibits communication between the drivers of the electronic control module and the primary fuel injectors;
wherein after the controller has operated the switch into the first operational mode then the electronic control module controls the primary fuel injectors in the first operational mode via the drivers and the switch, independently of operational input from the control unit; and
wherein after the controller has operated the switch into the second operational mode then the electronic control module controls the secondary fuel injectors in the second operational mode via the drivers and the switch, independently of operational input from the control unit.

2. The system of claim 1, wherein the electronic control module communicates with the control unit via a CAN-bus.

3. The system of claim 1, wherein the control unit downloads and stores the operational information for the first operational mode from the electronic control module.

4. The system of claim 3, wherein the control unit is initially configured to upload the operational information for the second operational mode to the electronic control module so as to transition the system to the second operational mode.

5. The system of claim 4, wherein the control unit is configured to upload the operational information for the first operational mode to the electronic control module to transition the system from the second operational mode back to the first operational mode.

6. The system of claim 1, wherein the control unit is positioned within a cab of the vehicle.

7. The system of claim 6, wherein the control unit comprises a user interface configured to display information obtained from the electronic control module.

8. A method of operating a bi-fuel control system for an automotive vehicle, the method comprising:
receiving user input from a user via a user interface portion of a control unit to operate a system of a vehicle that enables an internal combustion engine of the vehicle to use either a primary fuel in a first operational mode or a secondary fuel in a second operational mode, wherein the system is equipped to operate on either the primary fuel in the first operational mode or the secondary fuel in the second operational mode;
wherein the system comprises
pairs of fuel injectors, wherein each pair comprises a primary fuel injector configured to deliver a primary fuel to the engine when the system is in a first operational mode and a secondary fuel injector configured to deliver a secondary fuel to the engine when the system is in a second operational mode, wherein each fuel injector has a positive terminal and a negative terminal, wherein the positive terminals of the primary fuel injectors are coupled with each other, and wherein the positive terminals of the secondary fuel injectors are coupled with each other;
an electronic control module, wherein the electronic control module comprises a set of drivers, wherein each driver has a positive terminal and a negative terminal, and wherein the positive terminals of the drivers are coupled with each other, and wherein each negative terminal of each driver is coupled with the negative terminals of one of the pairs of the primary fuel injectors and secondary fuel injectors; and
a switch;
storing operational information for the first operational mode in the control unit and operational information for the second operational mode in the control unit;
uploading, from the control unit, either the operational information for the first operational mode or the operational information for the second operation mode into the electronic control module so as to selectively transition the system back and forth from the first operational mode to the second operational mode or from the second operational mode to the first operational mode; and
controlling the switch via a controller coupled with the switch and the control unit, wherein the controller operates the switch into the first operational mode or the second operational mode based on information received from the control unit;
wherein, when the system is in the first operational mode, the switch establishes communication between the drivers of the electronic control module and the primary fuel injectors and inhibits communication between the drivers of the electronic control module and the secondary fuel injectors;
wherein, when the system is in the second operational mode, the switch establishes communication between the drivers of the electronic control module and the secondary fuel injectors and inhibits communication between the drivers of the electronic control module and the primary fuel injectors;
wherein after the controller has operated the switch into the first operational mode then the electronic control module controls the primary fuel injectors in the first operational mode via the drivers and the switch, independently of operational input from the control unit; and wherein after the controller has operated the switch into the second operational mode then the electronic control module controls the secondary fuel injectors in the second operational mode via the drivers and the switch independently of operational input from the control unit.

9. The method of claim 8, wherein the electronic control module is factory installed equipment and remains connected with other factory installed equipment throughout the method.

10. The method of claim 8, wherein the control unit is aftermarket equipment and remains connected with factory installed equipment throughout the method.

11. A bi-fuel control system for an automotive vehicle, the system comprising:

an internal combustion engine;

at least one pair of fuel injectors comprising a first pair of a primary fuel injector configured to deliver a primary fuel to the engine when the system is in a first operational mode and a secondary fuel injector configured to deliver a secondary fuel to the engine when the system is in a second operational mode;

an electronic control module;

a control unit communicatively coupled with the electronic control module;

a first switch;

a first communication line, wherein the first communication line connects the first switch to the electronic control module;

a second communication line, wherein the second communication line connects the first switch to the primary fuel injector;

a third communication line, wherein the third communication line connects the first switch to the secondary fuel injector; and a first controller coupled with the control unit and the first switch, wherein the first controller operates the first switch into the first operational mode or the second operation mode based on information received from the control unit;

wherein the control unit stores operational information for the first operational mode and operational information for the second operational mode;

wherein the control unit uploads either the operational information for the first operational mode or the operational information for the second operation mode into the electronic control module so as to selectively transition the system back and forth from the first operational mode to the second operational mode or from the second operational mode to the first operational mode;

wherein, when the system is in the first operational mode, the first switch establishes communication between the electronic control module and the primary fuel injector and inhibits communication between the electronic control module and the secondary fuel injector;

wherein, when the system is in the second operational mode, the first switch establishes communication between the electronic control module and the secondary fuel injector and inhibits communication between the electronic control module and the primary fuel injector;

wherein after the first controller has operated the first switch into the first operational mode then the electronic control module controls the primary fuel injector in the first operational mode via a circuit including the first communication line, the first switch, and the second communication line, independently of operational input from the control unit; and wherein after the first controller has operated the first switch into the second operational mode then the electronic control module controls the secondary fuel injectors in the second operational mode via a circuit including the first communication line, the first switch, and the third communication line, independently of operational input from the control unit.

12. The system of claim 11, further comprising a second switch;

wherein the at least one pair of fuel injectors further comprises a second pair of a primary fuel injector configured to deliver a primary fuel to the engine when the system is in a first operational mode and a secondary fuel injector configured to deliver a secondary fuel to the engine when the system is in the second operational mode; and wherein the second switch is connected for communication with the primary fuel injector and the secondary fuel injector of the second pair.

13. The system of claim 12, wherein the first controller is coupled with the second switch, wherein the first controller operates the second switch into the first operational mode or the second operation mode based on information received from the control unit.

14. The system of claim 12, further comprising a second controller coupled with the control unit and the second switch, wherein the second controller operates the second switch into the first operational mode or the second operation mode based on information received from the control unit.

15. The system of claim 11, wherein the control unit downloads and stores the operational information for the first operational mode from the electronic control module.

16. The system of claim 15, wherein the control unit is initially configured to upload the operational information for the second operational mode to the electronic control module so as to transition the system to the second operational mode.

17. The system of claim 16, wherein the control unit is configured to upload the operational information for the first operational mode to the electronic control module to transition the system from the second operational mode back to the first operational mode.

18. The system of claim 11, wherein the control unit is positioned within a cab of the vehicle.

19. The system of claim 18, wherein the control unit comprises a user interface configured to display information obtained from the electronic control module.

20. A bi-fuel control system for an automotive vehicle, the system comprising:

an internal combustion engine;

pairs of fuel injectors, wherein each pair comprises a primary fuel injector configured to deliver a primary fuel to the engine when the system is in a first operational mode and a secondary fuel injector configured to deliver a secondary fuel to the engine when the system is in a second operational mode, wherein each fuel injector has a positive terminal and a negative terminal, wherein the positive terminals of the primary fuel injectors are coupled with each other, and wherein the positive terminals of the secondary fuel injectors are coupled with each other;

an electronic control module, wherein the electronic control module comprises a set of drivers, wherein each driver has a positive terminal and a negative terminal, and wherein the positive terminals of the drivers are coupled with each other, and wherein each negative terminal of each driver is coupled with the negative terminals of one of the pairs of the primary fuel injectors and secondary fuel injectors;

a control unit communicatively coupled with the electronic control module;

a switch;

a set of first communication lines, wherein each of the first communication lines connects the switch to each of the drivers;

a set of second communication lines, wherein each of the second communication lines connects the switch to each of the primary fuel injectors;

a set of third communication lines, wherein each of the third communication lines connects the switch to each of the secondary fuel injectors; and a controller coupled with the control unit and the switch, wherein the controller operates the switch into the first operational mode or the second operation mode based on information received from the control unit;

wherein the control unit stores operational information for the first operational mode and operational information for the second operational mode;

wherein the control unit uploads either the operational information for the first operational mode or the operational information for the second operation mode into the electronic control module so as to selectively transition the system back and forth from the first operational mode to the second operational mode or from the second operational mode to the first operational mode;

wherein, when the system is in the first operational mode, the switch establishes communication between the drivers of the electronic control module and the primary fuel injectors and inhibits communication between the drivers of the electronic control module and the secondary fuel injectors;

wherein, when the system is in the second operational mode, the switch establishes communication between the drivers of the electronic control module and the secondary fuel injectors and inhibits communication between the drivers of the electronic control module and the primary fuel injectors;

wherein after the controller has operated the switch into the first operational mode then the electronic control module controls the primary fuel injectors in the first operational mode via a circuit including the first communication lines, the switch, and the second communication lines, independently of operational input from the control unit; and wherein after the controller has operated the switch into the second operational mode then the electronic control module controls the secondary fuel injectors in the second operational mode via a circuit including the first communication lines, the switch, and the third communication lines, independently of operational input from the control unit.

21. The system of claim 20, wherein the control unit downloads and stores the operational information for the first operational mode from the electronic control module.

22. The system of claim 21, wherein the control unit is initially configured to upload the operational information for the second operational mode to the electronic control module so as to transition the system to the second operational mode.

23. The system of claim 22, wherein the control unit is configured to upload the operational information for the first operational mode to the electronic control module to transition the system from the second operational mode back to the first operational mode.

24. The system of claim 20, wherein the control unit is positioned within a cab of the vehicle.

25. The system of claim 24, wherein the control unit comprises a user interface configured to display information obtained from the electronic control module.

* * * * *